(12) United States Patent
Kuo

(10) Patent No.: US 6,637,582 B1
(45) Date of Patent: Oct. 28, 2003

(54) BOARD TRANSMITTING DEVICE FOR AN UPRIGHT PC BOARD ETCHING MACHINE

(76) Inventor: Matthew Kuo, Fl. 5, No. 6, Alley 16, Lane 410, Section 2, Pa Teh Road, Taipei (TW)

(*) Notice: Subject to any disclaimer, the term of this patent is extended or adjusted under 35 U.S.C. 154(b) by 521 days.

(21) Appl. No.: 09/706,848

(22) Filed: Nov. 7, 2000

(51) Int. Cl.[7] .......................... B65G 15/22; B65G 29/02
(52) U.S. Cl. ...................... 198/622; 198/620; 198/624; 198/817; 156/345.51; 156/345.54
(58) Field of Search ................................ 198/622, 620, 198/624, 817; 156/345.51, 345.54

(56) References Cited

U.S. PATENT DOCUMENTS

| 4,597,819 | A | * | 7/1986 | Kusuhara et al. ........... 156/345 |
| 5,029,696 | A | * | 7/1991 | Van Tilburg ............. 198/626.1 |
| 6,170,733 | B1 | * | 1/2001 | Fritz, Sr. ..................... 198/817 |
| 6,371,277 | B1 | * | 4/2002 | Malinie .................... 198/621.3 |

FOREIGN PATENT DOCUMENTS

| JP | 62-201720 | * | 9/1987 | ................. 198/624 |
| JP | 64-5792 | * | 1/1989 | ................. 198/620 |

* cited by examiner

*Primary Examiner*—Douglas Hess
(74) *Attorney, Agent, or Firm*—Rosenberg, Klein & Lee

(57) ABSTRACT

A board transmitting device for an upright PC board etching machine, includes a plurality of units each of which includes a U-shaped frame with a pair of serial wheel frames uprightly inserted in an upper end of both sides thereof, a rotation transmitting wheel disposed between and at one end of the U-shaped frame into which the serial wheel frames are inserted, and a power steering wheel disposed at the other end of the U-shaped frame opposite to the serial wheel frames. The plurality of units are mounted continuously to form an array of board transmitting device for an upright transmitting PC board of a certain length to drive a rotary shaft that passes through each of the power steering wheels so that each of the wheel frames and each of the rotation transmitting wheels rotate synchronously, and so that a clearance defined between two adjacent ones of the rotary wheels on each pair of the serial wheel frames can positively clamp and advance an upright PC board at a fixed-speed and with a fixed displacement space to ensure transmission and facilitate maintenance so as to enhance etching operation. The components of the unit are formed with inter-engageable engaging members to facilitate replacement thereof, and to ensure transmission and facilitate maintenance so as to enhance etching operation efficiency.

3 Claims, 5 Drawing Sheets

BOARD TRANSMITTING DEVICE FOR AN UPRIGHT PC BOARD ETCHING MACHINE

BACKGROUND OF THE INVENTION (a) Field of the Invention

The present invention relates to a board transmitting device for an upright PC board etching machine.

(b) Description of the Prior Art

At present, the etching machines used in manufacturing PC boards include PC board translational etching and upright PC board etching. In the former type, spraying of corrosive agents includes upward and downward spraying. The latter is usually applied to larger circuits (e.g., PC boards for radios), in which the corrosive agent is ejected from a nozzle and is sprayed downwardly to a PC board placed horizontally on a conveyer to perform etching of circuits. Although the construction is simple, there is a drawback that during etching, the liquid on the horizontally placed PC board cannot be easily removed. The liquid will form a water film to slow down the subsequent etching washing force applied so that the etching effect is affected. A greater washing force is required in order to allow the corrosive agent to flow along the board surface. The quality of a PC board thus formed is not satisfactory.

The spraying of corrosive agent upwardly is generally used on etching finer circuits on single-sides PC boards. The corrosive agent is ejected from a nozzle and is sprayed upwardly onto a PC board placed horizontally on an open type conveyer to perform circuit etching. Due to the weight of the liquid, there is no accumulation of liquid on the board. The etching effect is therefore better. However, the construction is complicated and costly.

With greater demands for more double-sided PC boards, manufacturers have to use double-sided etching techniques. Earlier, translational etching was adopted. With translational etching, the corrosive spraying mechanism is disposed at the upper end, while the corrosive agent upward spraying mechanism is disposed at the lower end to thereby achieve a double-sided etching effect. However, this construction also suffers from the drawback associated with translational single-sided etching. The product quality is also not satisfactory.

To overcome the aforesaid drawbacks, there have been developed a type of etching machine for performing upright PC board etching. The PC board is clamped and transferred in an upright manner, and the corrosive agent is sprayed thereonto from the outer ends of two side plates so that etching can be done on both sides of the board. There is not the problem of water accumulated on the board or the drawbacks associated with upward spraying of corrosive agent. However, the PC board transmitting mechanism in this construction is not satisfactory, as described hereinafter.

FIG. 1 is a schematic view of a vertical clamping suspending type transmitting mechanism. A plurality of clamps 20, 21 . . . are suitably spaced apart and secured on a moving rail 10 to clamp PC boards 30 in advancement. Spraying nozzles at outer ends of two side plates spray a corrosive agent thereonto to perform circuit etching. Since the lower end of the PC board 30 is suspended, it will shake when subjected to the pressure of the ejected corrosive agent, and the downward clamping force of the clamps 20, 21 . . . will decrease gradually. Oftentimes, the clamps 20, 21 . . . cannot clamp the PC board 300 tightly to allow it to drop. The etching effect is therefore not good, and the etching operation is affected.

Referring to FIG. 2, which shows a vertical type transmitting mechanism of an etching machine. A PC board 40 is erected on a conveyor 50, and a plurality of fine wires 60, 61 . . . are provided on both sides of the PC board 40 to prevent the PC board 40 from shaking. These fine wires 60, 61 cannot be too close to the PC board lest that the PC board 40 is clamped too tightly by these wires 60, 61 to hinder advancement of the PC board 40 on the conveyor 50. Due to the barrier effect of the loose wires 60, 61 . . . during the spraying of corrosive agent onto the PC board 40, the PC board 40 will shake, which affects the etching effect. In addition, the PC board 40 is simply placed on the conveyor 50 and is not positively retained in position. As such, the PC board 40 may be caused to displace by the force of spraying when passing through the corrosive agent spraying mechanism on both sides thereof so that the PC boards 40 advance at an irregular speed, which considerably affect the etching effect.

SUMMARY OF THE INVENTION

The present invention relates to a board transmitting device for an upright PC board etching machine.

The primary object of this invention is to provide a board transmitting device for a Upright PC board etching machine, which includes a plurality of serial wheel frames with rotary wheels mounted thereon to clamp and advance PC boards so that the PC boards can advance at a regular speed and stably.

Another object of this invention is to provide a board transmitting device for a Upright PC board etching machine, in which the components are inter-engageable to facilitate replacement and maintenance thereof and to enhance etching efficiency.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
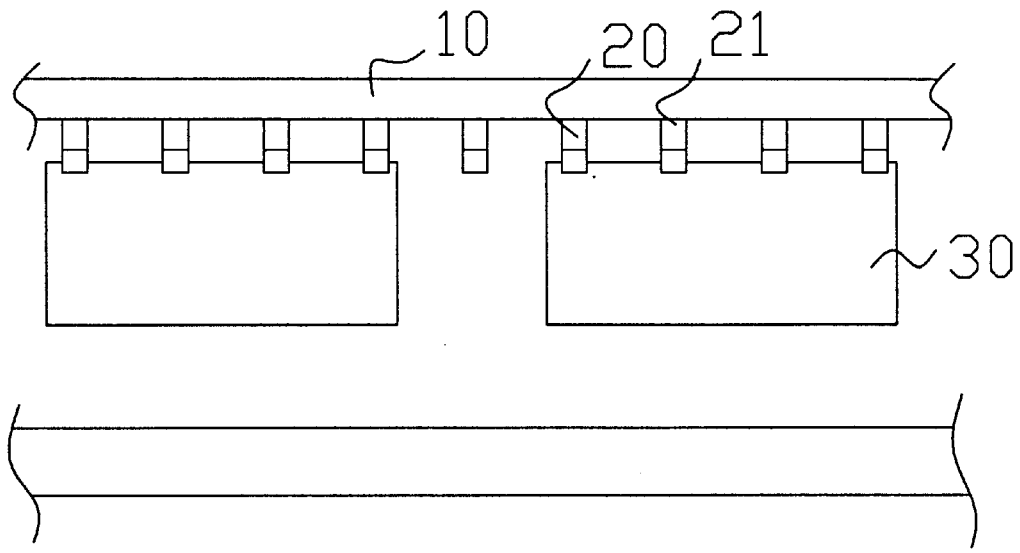
FIG. 1 is a schematic view illustrating a conventional vertical clamping suspending type transmitting mechanism for an upright PC board etching machine.
Figure 2:
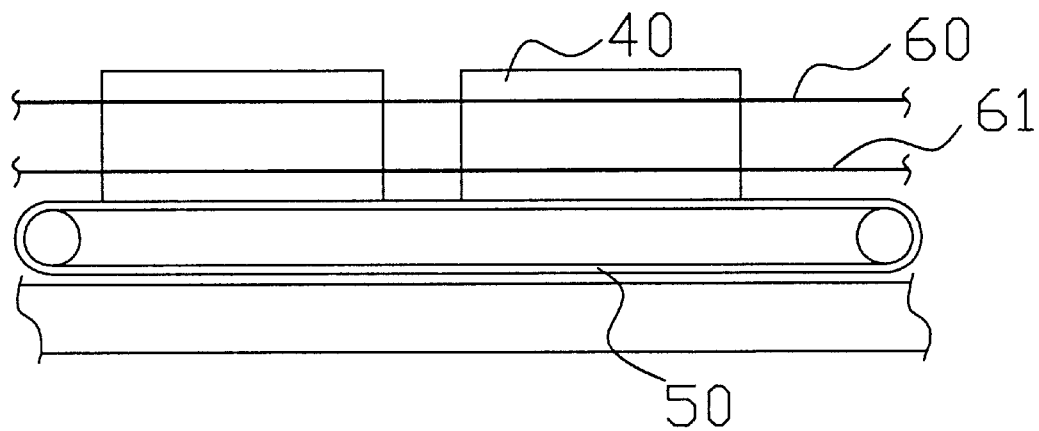
FIG. 2 is a schematic view showing another conventional transmitting mechanism for an upright PC board etching machine.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
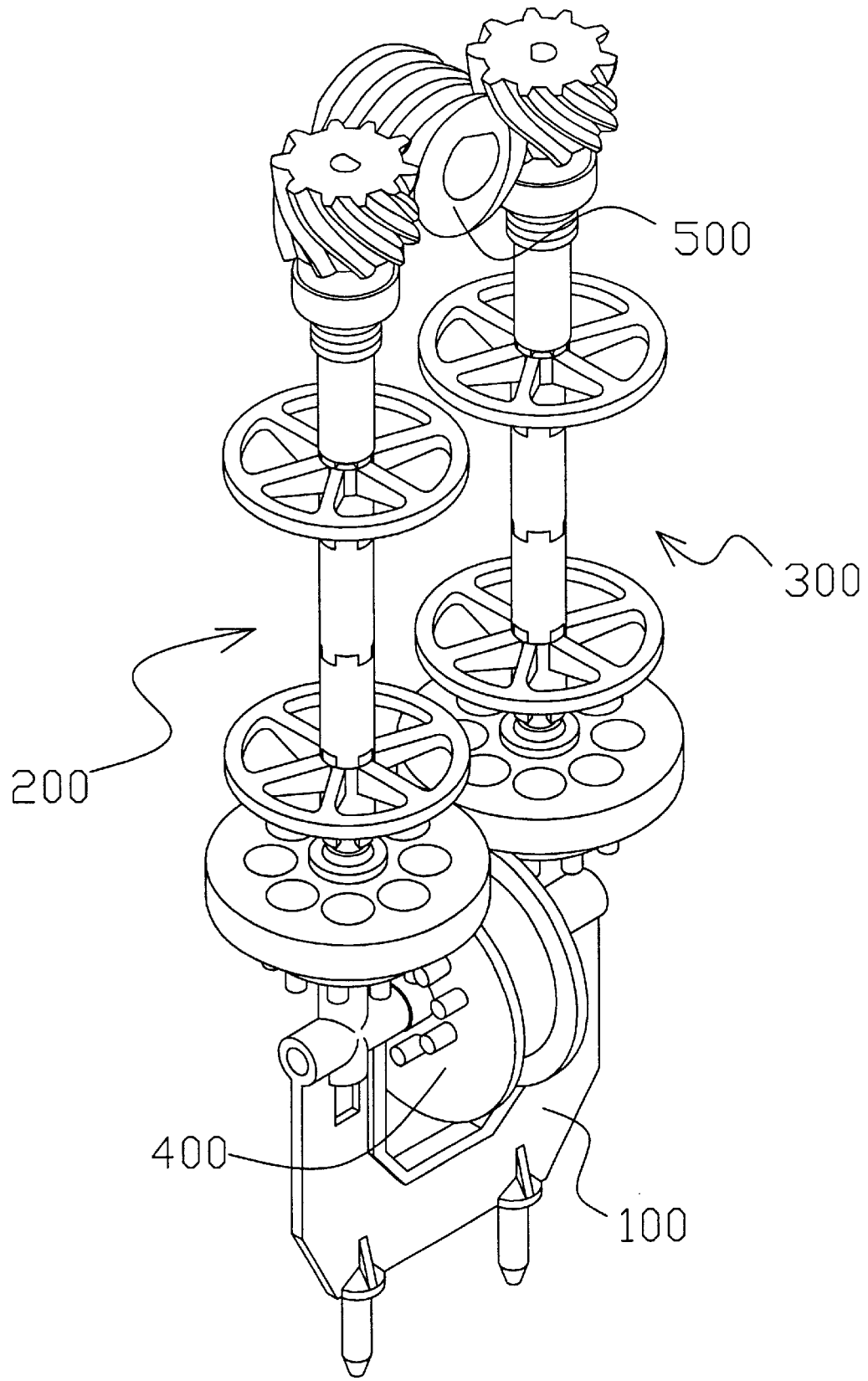
FIG. 3 is a perspective view of the preferred embodiment of a board transmitting mechanism for an upright PC board etching machine according to the present invention.

FIG. 3 shows a constituting unit of a board transmitting device for an upright PC board etching machine of this invention. As shown, the unit includes a U-shaped frame 100 with a pair of serial wheel frames 200, 300 uprightly inserted in the upper end of both sides thereof, a rotation transmitting wheel 400 disposed between and at one end of the U-shaped frame 100 into which the serial wheel frames 200, 300 are inserted, and a power steering wheel 500 disposed at the other end of the U-shaped frame 100 opposite to the serial wheel frames 200, 300.

Figure 4:
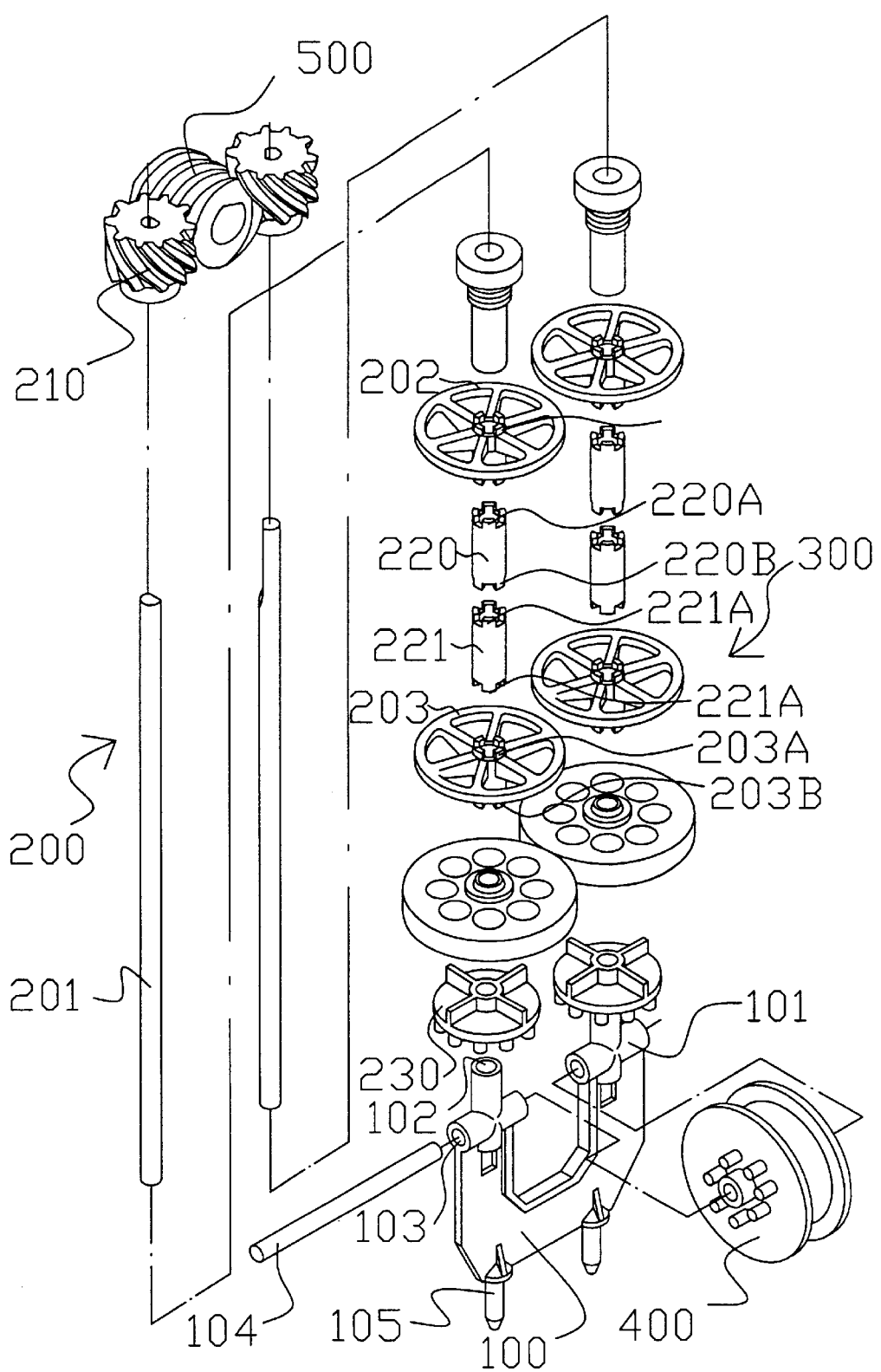
FIG. 4 is an exploded perspective view of the preferred embodiment.

Referring to FIG. 4, cross-shaped pivoting arms 101 are formed at the top end of both sides of the U-shaped frame 100. Each pivoting arm 101 is provided with holes 102, 103 in the vertical and horizontal directions. The serial wheel frames 200, 300 are inserted into the vertical holes 102. A shaft 104 passes through the horizontal holes 103 to be pivotally connected to the rotation transmitting wheel 400. A positioning post 105 extends vertically from each of the two sides of the bottom edge of the U-shaped frame 100 to be inserted into a suitable positioning hole in the etching machine. The power steering wheel 500 may be a spiral rod, while the rotation transmitting wheel 400 may be a rotary wheel. As the serial wheel frames 200, 300 are identical in structure, the invention is exemplified using the serial wheel frame 200 only. The serial wheel frame 200 includes a frame shaft 201 having a series of rotary wheels 202, 203 . . . mounted thereon, a driven gear 210, a plurality of connecting tubes 220,221, . . . , and a transmitting wheel 230. The driven gear 210 is secured to the frame shaft 201 proximate to the power steering wheel 500, and engages the power steering wheel 500. The end of the frame shaft 210 that is extended through the vertical hole 102 is fitted with the transmitting wheel 230, which engages the rotation transmitting wheel 400. The rotary wheels 202, 202, are suitably spaced apart by the connecting tubes 220, 221, . . . , and are mounted on the intermediate section of the frame shaft 201. The portions of each of the rotary wheels 202, 203, that project from both sides of the hub and the opposite ends of each connecting tube 220, 221, are formed with crown-shaped engaging members 202A, 202B, 203a, 203B, 220A, 220B, 221A, 221B, of complementary configurations such that each of the rotary wheels 202, 203, . . . and each of the connecting tubes 220, 221, an inter-engaged tightly in a series by means of the engaging members 202A, 202B, 203a, 203B, 220A, 220B, 221A, 221B. The engaging members can be easily detached from each other to permit replacement of individual components. Besides, after the engaging members are inter-engaged, they can ensure that power can be positively transmitted via each of the engaging members.

Figure 5:
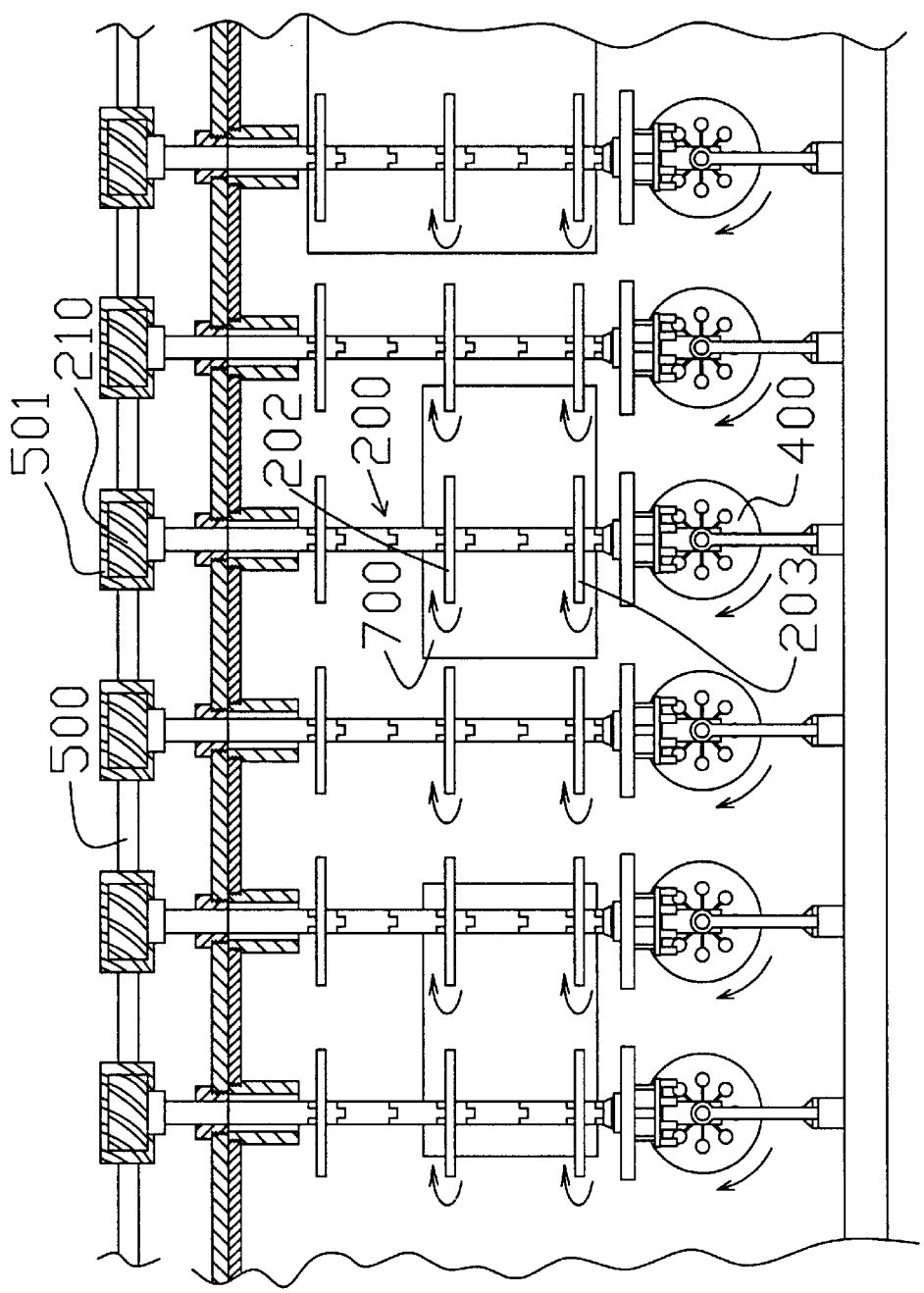
FIG. 5 is a schematic view illustrating operation of the preferred embodiment.
Figure 6:
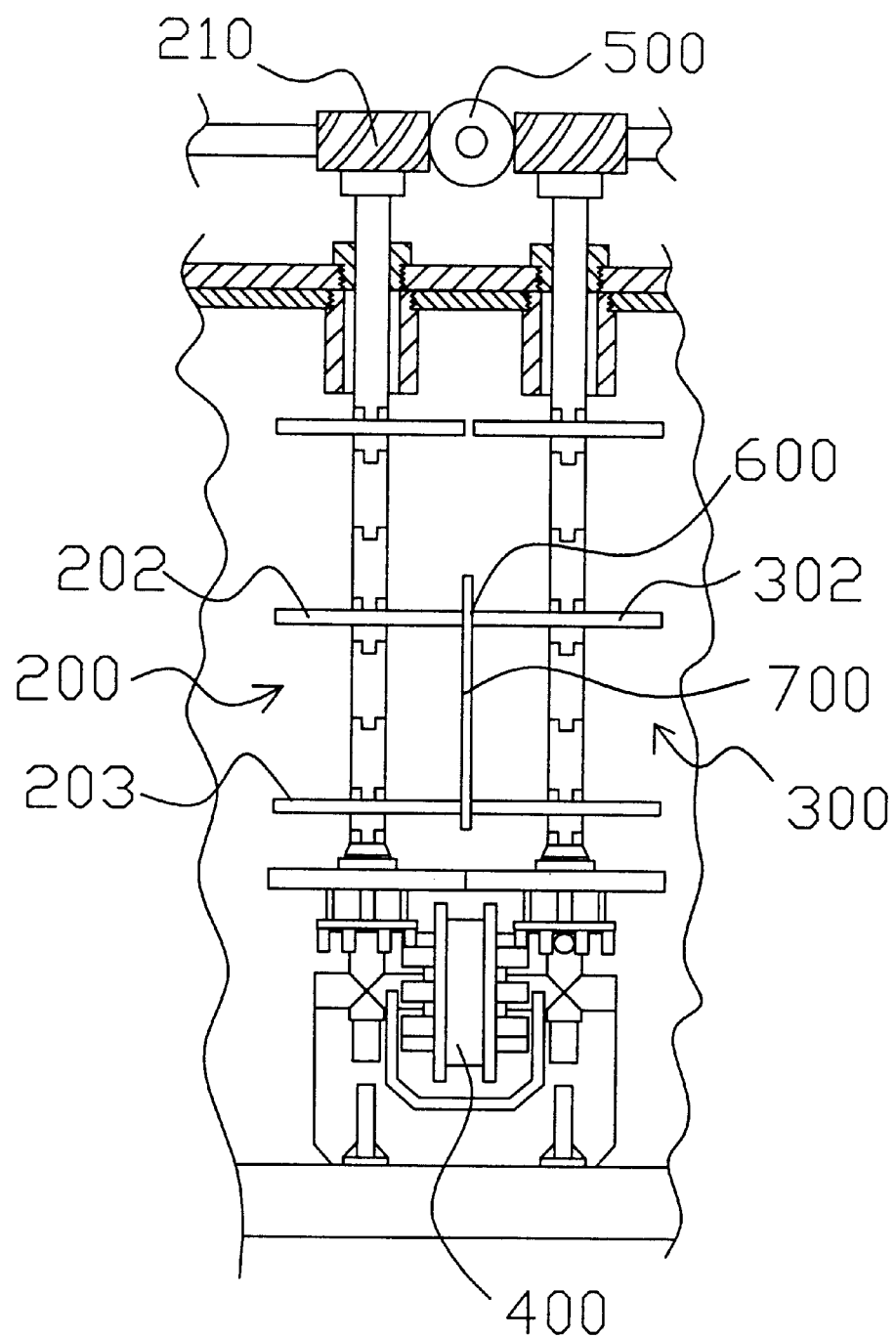
FIG. 6 is a sectional view of FIG. 5.

With reference to FIGS. 5 and 6, a plurality of the above-described units can be mounted continuously to form an array of board transmitting device for an upright transmitting PC board of a certain length to drive a rotary shaft 501 that passes through each of the power steering wheels 500 so that each wheel frame 200, . . . and each rotation transmitting wheel 400 rotate synchronously, and so that a clearance defined between two adjacent rotary wheels 202, 302 on each pair of the serial wheel frames 200, 300 can positively clamp and advance an upright PC board 700 at a fixed-speed and with a fixed displacement space, thereby ensuring transmission and facilitating maintenance to enhance etching operation efficiency.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and chances in the forms and details of the device illustrated and in its operation can be made by those skilled in the art without departing in any way from the spirit of the present invention.

I claim:

1. A board transmitting device for an upright PC board etching machine, comprising a plurality of units, each of which includes a U-shaped frame with a pair of serial wheel frames uprightly inserted in an upper end of both sides thereof, a rotation transmitting wheel disposed between and at one end of said U-shaped frame into which said serial wheel frames are inserted, and a power steering wheel disposed at the other end of said U-shaped frame opposite to said serial wheel frames, said plurality of units being mounted continuously to form an array of board transmitting devices an upright transmitting PC board of a certain length, to drive a rotary shaft that passes through each of said power steering wheels so that each of said wheel frames and each of said rotation transmitting wheels rotate synchronously, and so that a clearance defined between two adjacent ones of said rotary wheels on each pair of said serial wheel frames can positively clamp and advance an upright PC board at a fixed-speed and with a fixed displacement space to ensure transmission and facilitate maintenance so as to enhance etching operations, each component of each of said units being formed with inter-engageable engaging members.

2. The board transmitting device for an upright PC board etching machine according to claim 1, wherein cross-shaped pivoting arms are formed at the top end of both sides of said U-shaped frame, each of said pivoting arms being provided with vertical and horizontal holes, said serial wheel frames being inserted into said vertical holes, a shaft passing through said horizontal holes to be pivotally connected to said rotation transmitting wheel, a positioning post extending vertically from each of the two sides of the bottom edge of said U-shaped frame to be inserted into a suitable positioning hole in the etching machine.

3. The board transmitting device for an upright PC board etching machine according to claim 2, wherein said power steering wheel may be a spiral rod, and said rotation transmitting wheel may be a rotary wheel, each of said serial wheel frames including a frame shaft having a series of rotary wheels mounted. thereon, a driven gear, a plurality of connecting tubes, and a transmitting wheel, said driven gear being secured to said frame shaft proximate to said power steering wheel and engaging said power steering wheel, the end of said frame shaft that is extended through said vertical hole is fitted with said transmitting wheel, which engages said rotation transmitting wheel, said rotary wheels being suitably spaced apart by said connecting tubes and mounted on an intermediate section of said frame shaft, the portions of each of said rotary wheels that project from both sides of a hub and opposite ends of each of said connecting tubes being formed with crown-shaped engaging members of complementary configurations such that each of said rotary wheels and each of said connecting tubes can be inter-engaged tightly in a series by means of said engaging members.

* * * * *